United States Patent [19]
Endo et al.

[11] Patent Number: 4,736,129
[45] Date of Patent: Apr. 5, 1988

[54] ULTRASONIC MOTOR

[75] Inventors: Akira Endo; Nobutoshi Sasaki, both of Nagai, Japan

[73] Assignee: Marcon Electronics Co., Ltd., Nagai, Japan

[21] Appl. No.: 867,229

[22] Filed: May 27, 1986

[30] Foreign Application Priority Data

| May 30, 1985 | [JP] | Japan | 60-117956 |
| Aug. 29, 1985 | [JP] | Japan | 60-191669 |
| Aug. 30, 1985 | [JP] | Japan | 60-192772 |
| Oct. 25, 1985 | [JP] | Japan | 60-240281 |
| Nov. 5, 1985 | [JP] | Japan | 60-248330 |
| Nov. 15, 1985 | [JP] | Japan | 60-257447 |

[51] Int. Cl.⁴ ............................................ H01L 41/08
[52] U.S. Cl. ........................................ 310/323; 310/328
[58] Field of Search ................................ 310/323, 328

[56] References Cited

U.S. PATENT DOCUMENTS

| 4,019,073 | 4/1977 | Vishnevsky et al. | 310/323 |
| 4,634,916 | 1/1987 | Okada et al. | 310/323 |

FOREIGN PATENT DOCUMENTS

| 52-29192 | 4/1977 | Japan . |
| 58148682 | 3/1982 | Japan . |
| 58-32518 | 7/1983 | Japan . |

Primary Examiner—Mark O. Budd
Attorney, Agent, or Firm—Oblon, Fisher, Spivak, McClelland & Maier

[57] ABSTRACT

An ultrasonic motor includes piezoelectric resonators for generating vibration waves, an elastic vibration member along which an elastic wave propagates when driving of the piezoelectric resonators is driven, a sliding member located in contact with the elastic vibration member under pressure and adapted to slide along the elastic vibration member when the elastic wave propagates, and a friction member located on the sliding member and brought into frictional contact with the elastic vibration member, the friction member being made of a material having a hardness of less than 100 and larger than 94 measured by a spring A type hardness tester, a hardness of 40 to 120 measured by a Rockwell's R type hardness tester, hardness of 20 to 80 measured by a Rockwell's M type hardness tester, a hardness of 40 to 90 measured by a Shore A type hardness tester, or a hardness of 20 to 70 measured by a Shore D type hardness tester.

36 Claims, 17 Drawing Sheets

F I G. 25
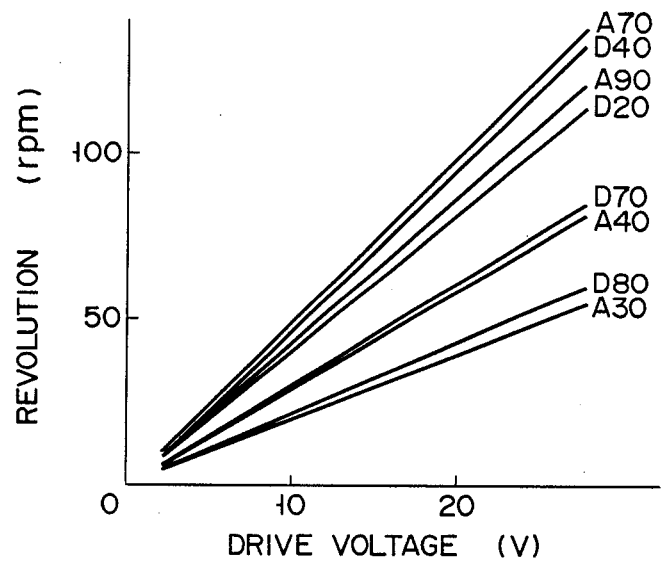
F I G. 26
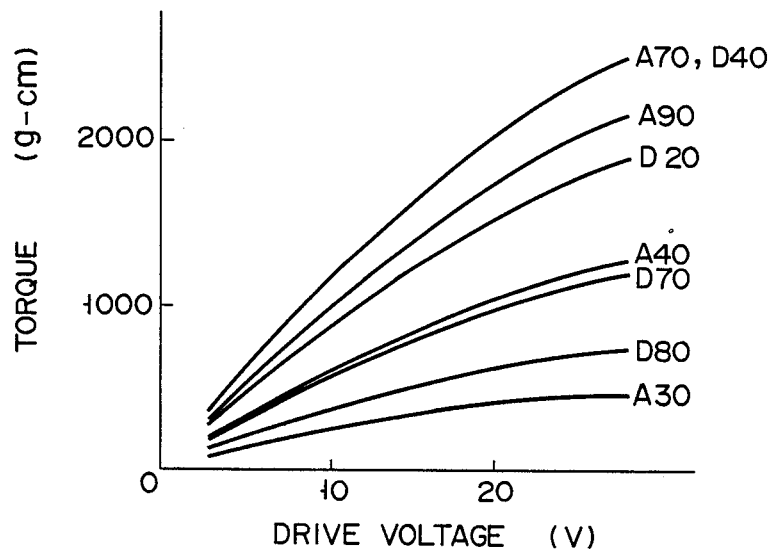

ULTRASONIC MOTOR

BACKGROUND OF THE INVENTION

The present invention relates to an ultrasonic motor driven by the vibration of a piezoelectric element.

A typical conventional ultrasonic motor is illustrated in FIG. 1. The motor includes elastic vibrating member 2 which is vibrated by a piezoelectric resonator, and sliding member 4 mounted above member 2. Friction member 6 is adhered to member 4 and is in contact with member 2. The principle of driving of the ultrasonic motor will be described with reference to FIG. 2.

The vibration to member 2 is transferred of the resonator, as shown in FIG. 2. Member 2 generates elastic wave 8. Wave 8 propagates in the member 2 in the direction of arrow A. At material particle 12 on the surface of member 2, wave 8 propagates along an ellipse 13 having longitudinal amplitude C and transverse amplitude D. As wave 8 propagates in the direction of arrow A, it rotates counterlockwise (FIG. 2) along the ellipse. Wave 8 passes through vertex 10 for each wavelength, and member 6 is brought into tight contact with member 2 at vertex 10 of elastic wave 8. However, particle 12 is subjected to elliptical motion, and thus a vector acts on particle 12. The vector acting on particle 12 at vertex 10 is transferred by a frictional force created between members 2 and 6, thereby causing member 6 to move in a direction B opposite the propagation direction A of wave 8.

In linear or rotational ultrasonic motors of this type, a metal with a high Young's modulus is used for member 2 to improve propagation efficiency of the elastic wave. However, if a member 6 is made of a metal which is hard, elastic wave vibrations and a frictional force cause noise and heat. Hence, member 6 can be made of elastic rubber. However, if member 6 is made of elastic rubber, it absorbs the vibrations and the frictional force, and a sufficient driving force (i.e, torque) cannot be obtained.

Ultrasonic motors are described in Article Nos. 1-2-1, 1-2-2, and 1-2-3, Spring 1985, of the Institute of Acoustics of Japan. Each motor disclosed therein has an elastic resonator and a member of a material such as vinyl, polycarbonate, polypropylene, or duracon as a contact member with a frictional member in contact with the elastic resonance member. However, such materials are thermoplastic resins. In particular, if vinyl is in an ultrasonic motor and it is rotated at high speed for a long period of time, the physical properties of the vinyl are changed due to frictional heat, and its initial properties cannot be maintained. The physical properties of polypropylene are also degraded by heat. Polycarbonate cannot withstand repeated loading and has poor durability. Since duracon has a very low friction coefficient, it cannot obtain a sufficient frictional force from the elastic wave.

SUMMARY OF THE INVENTION

It is an object of the present invention to provide an ultrasonic motor which has a large torque, low frictional noise, and good durability.

According to an aspect of the present invention, there is provided an ultrasonic motor which includes piezoelectric resonators for generating vibration waves, an elastic vibration member along which an elastic wave propagates when driving of the piezoelectric resonators is driven, a sliding member located in contact with the elastic vibration member under pressure and adapted to slide along the elastic vibration member when the elastic wave propagates, and a friction member located on the sliding member and brought into frictional contact with the elastic vibration member, the friction member being made of a material having a hardness of less than 100 and larger than 94 measured by a spring A type hardness tester, a hardness of 40 to 120 measured by a Rockwell's R type hardness tester, hardness of 20 to 80 measured by a Rockwell's M type hardness tester, a hardness of 40 to 90 measured by a Shore A type hardness tester, or a hardness of 20 to 70 measured by a Shore D type hardness tester.

BRIEF DESCRIPTION OF THE DRAWINGS

FIG. 25 is a graph the relationship between the revolution of the sliding member and the drive voltage when the hardness of various friction members is used as a parameter;

FIG. 26 is a graph showing the relationship between the motor torque and the drive voltage when the hardness of various friction members is used as a parameter;

DETAILED DESCRIPTION OF THE PREFERRED EMBODIMENTS

Preferred embodiments of the present invention will be described with reference to FIGS. 3 to 30.

Figure 1:
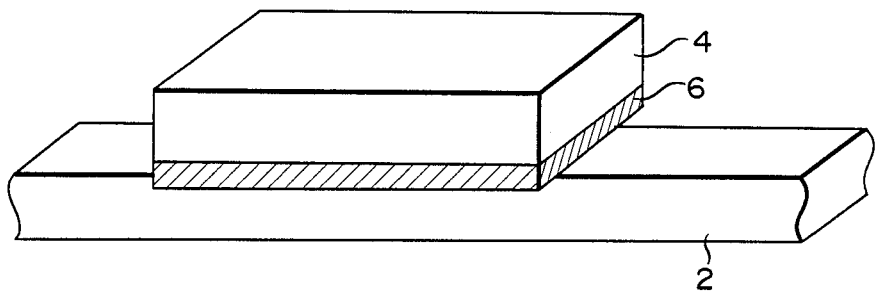
FIG. 1 is a perspective view showing the main part of a conventional linear ultrasonic motor.
Figure 2:
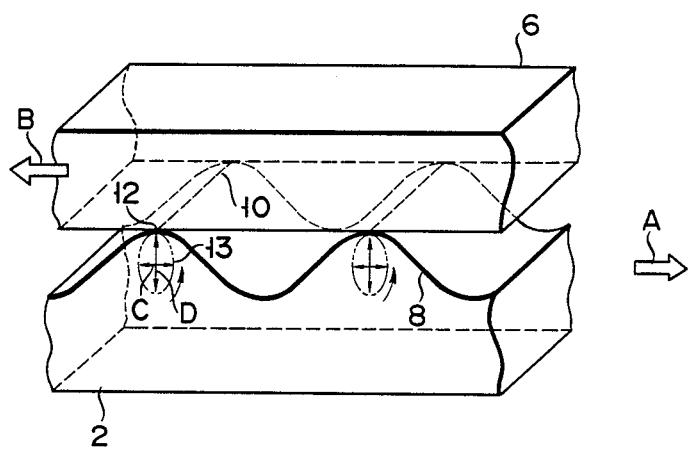
FIG. 2 is a perspective view for explaining the principle of driving of an ultrasonic motor.
Figure 3:
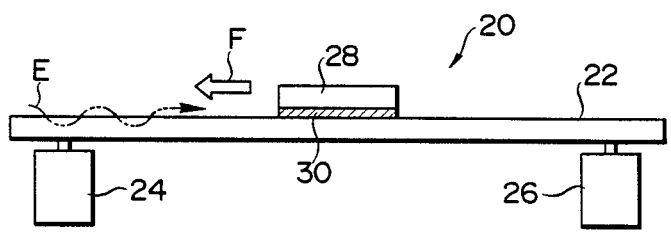
FIG. 3 is a schematic side view of a linear ultrasonic motor according to a first embodiment of the present invention.
Figure 4:
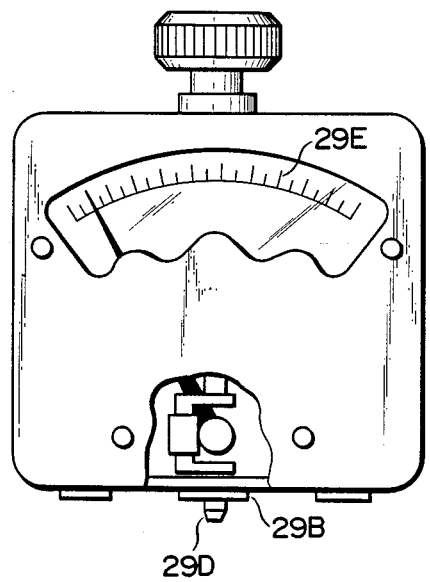
FIG. 4 is a front view of a spring A type hardness tester.

As shown in FIG. 3, elastic vibration member 22 is arranged in linear ultrasonic motor 20 of a first embodiment, along an elastic wave propagation direction. Member 22 is a duralumin rectangular column. Piezoelectric resonators 24 and 26 are arranged at two ends of member 22. Resonators 24 and 26 are made of a piezoelectric ceramic such as barium titanate (BaTiO$_3$) or lead zirconate titanate (PZT). Sliding member 28 is placed on member 22 and can be slid therealong. Member 28 is urged on member 22 by a spring (not shown). Member 28 is made of mechanical structure carbon steel (S-C steel) such as S45C. Friction plate 30 is adhered integrally with member 28, and is in contact with member 22.

Plate 30 is made of a material with a hardness of more than 94 and less than 100, measured by a spring hardness A type tester.

A hardness measurement method by the spring hardness A type tester will be described below.

1. A test sample having a thickness of 12 mm or more is prepared.

Figure 5:
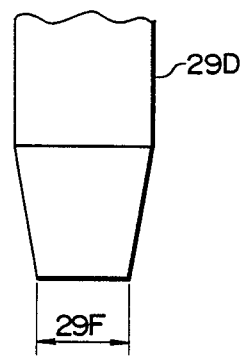
FIG. 5 is a side view showing a tip of a probe.
Figure 6:
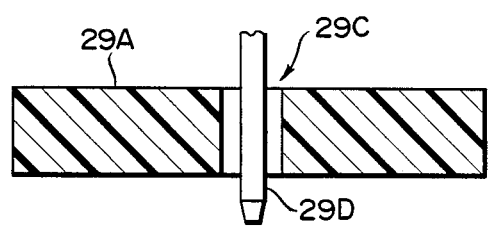
FIG. 6 is a partial sectional view for explaining a method of testing hardness of a sample.
Figure 7:
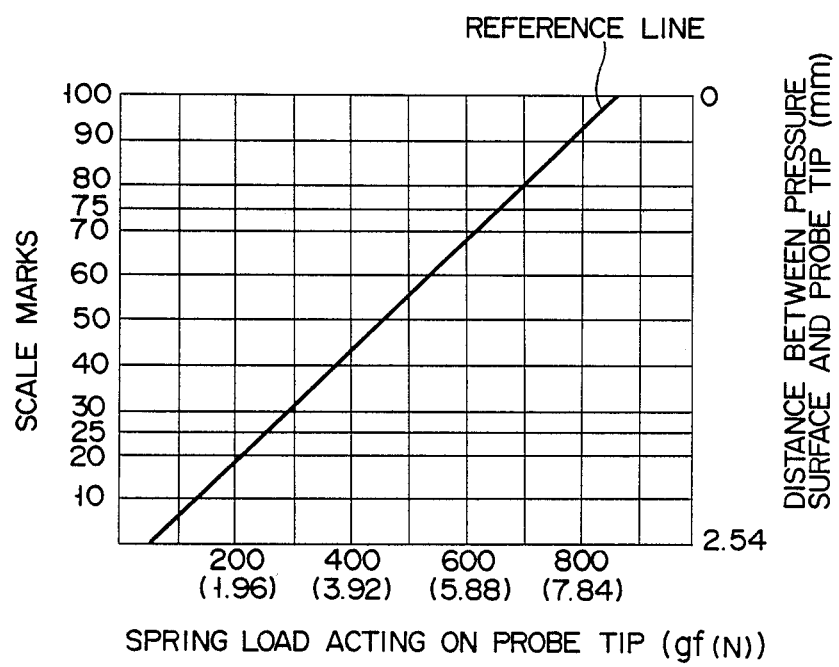
FIG. 7 is a graph showing the relationship between scale marks of the spring A type hardness tester and a load acting the probe tip.

2. Hardness of the sample is measured using the spring hardness tester shown in FIG. 4. In this tester, when pressure surface 29B is brought into contact with surface 29A of the sample, probe 29D extending from a central hole in pressure surface 29B is urged back by the sample. The distance that probe 29D is urged back is measured and indicated by scale marks 29E. Surface 29B is a surface perpendicular to probe 29D, and has central hole 29C through which probe 29D extends, as shown in FIG. 6. A diameter of hole 29C is 10 mm or more. FIG. 7 shows the relationship among the scale marks, probe movement, and the spring force. A reference line tolerance is ±8 g. No margin is provided between probe movement and pointer movement. A material of the probe has high resistance to wear and corrosion. As shown in FIG. 5, diameter 29F of the tip of the probe is about 0.79 mm. The probe is accurately aligned with the center of the hole of surface 29B. The probe tip extends from surface 29B by 2.54 mm when the scale indicates 0. The probe tip is at the same level as surface 29B when the scale indicates 100. The scales marks are obtained by dividing the scale range into 100 equal intervals.

Paper, cloth, leather, rubber, thermoplastic, thermoset, copolymer, resin and mixture material may be given as major examples of materials which hardness falls within the prescribed hardness range, that is, a hardness of less than 100 and more than 94 measured by a spring A type hardness. An additive such as an inorganic powder or a fibrous material is added to each of the above materials for controlling its hardness.

What follows are major kinds of rubber, thermoplastic, thermoset, copolymer, resin, and mixture material.

Rubber:
natural rubber (NR), styrene-butadiene rubber (SBR), butadiene rubber (BR), chloroprene rubber (CR), acrylonitrile-butadiene rubber (NBR), ethylene-propylene rubber (EPR), ethylenepropylene-diene terpolymer (EPDM), isoprene rubber (IR), isobutylene-isoprene rubber (IIR), acrylic rubber, urethan rubber.

Thermoplastic:
styrene resin, acrylic resin, polyethylene resin, polyamide resin, fluoroplastics, polyester resin, vinylidene chloride resin, polysulfone resin, polyphenylene sulfide.

Thermoset:
epoxy resin, unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ABS resin, ethylene-vinyl acetal copolymer resin (EVA), fluorinated ethylene propylene resin (FEP), MM resin, acetal resin, copolymer of epoxy resin and silicon resin, copolymer of polyethylene resin and styrene resin, copolymer of butadiene rubber (BR) and isobutylene-isoprene rubber (IIR), copolymer of chroloprene rubber (CR) and acrylonitrilebutadiene rubber (NBR).

Mixture material:
epoxy resin and acrylonitrile butadiene rubber (NBR), unsaturated polyester and styrene-butadiene rubber (SBR).

Examples of additives added to the major constituent are carbon black, silica, zinc white, magnesium oxide, calcium silicate, alumina, and talc.

In motor 20 of this embodiment, resonator 24 is driven to generate an elastic wave along member 22. The elastic wave propagates from resonator 24 to resonator 26 along member 22 (i.e., in the direction of arrow E in FIG. 3). In this case, member 28 is slid in a direction opposite to the elastic wave propagation direction, i.e., in the direction of arrow F. When resonator 26 is driven, member 28 is slid along a direction opposite the direction of arrow F.

TEST EXAMPLE 1

Figure 8:
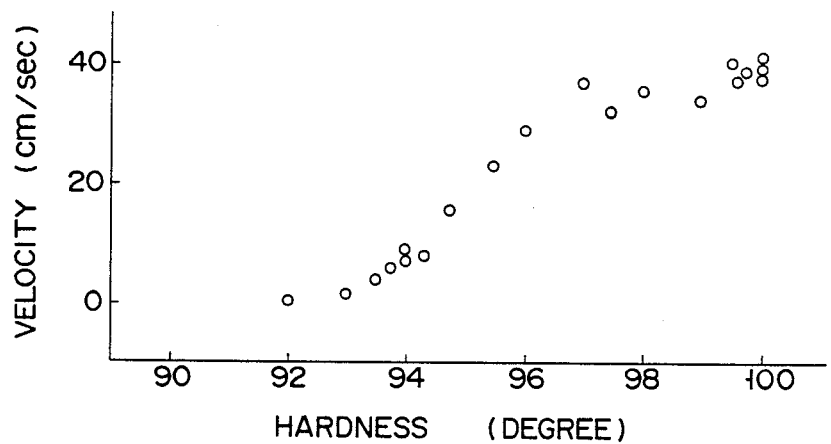
FIG. 8 is a graph showing the relationship between the hardness of a friction member and a velocity of a sliding member.

The relationship between the hardness of the friction member and the velocity of the sliding member when various friction materials are used is shown in FIG. 8. As is apparent from FIG. 8, when the hardness of a friction member material is greater than 94 and less than 100 measured by the spring hardness A type tester, a high velocity of about 5 cm/sec can be obtained for a predetermined piezoelectric resonance. In particular, the sliding member can be driven at a velocity of about 40 cm/sec within the friction member hardness range of 96 to 100. However, when the hardness is 94 or less, a satisfactory sliding velocity cannot be obtained, as is apparent from FIG. 8. This is estimated to be caused by absorption of the elastic wave by the friction member.

Figure 9:
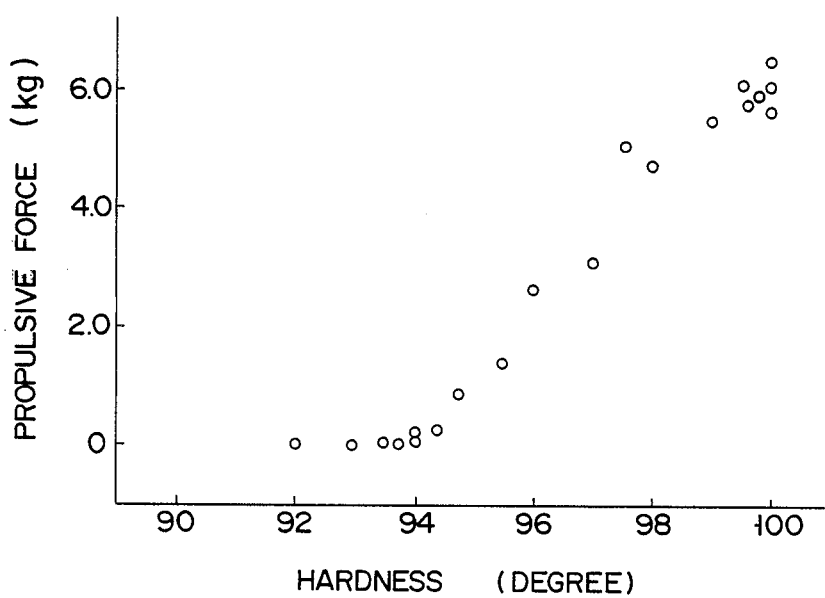
FIG. 9 is a graph showing the relationship between the hardness of the friction member and a propulsive force of the sliding member.

FIG. 9 shows the relationship between the hardness of the friction member material and a propulsive force of the sliding member. Almost no propulsive force can be generated when the hardness is 94 or less, as shown in FIG. 9. However, when the hardness falls within the range of 94 to 100, a large propulsive force can be obtained. In particular, a propulsive force of 2.0 kg/cm was obtained in the hardness range of 96 to 100.

Figure 10:
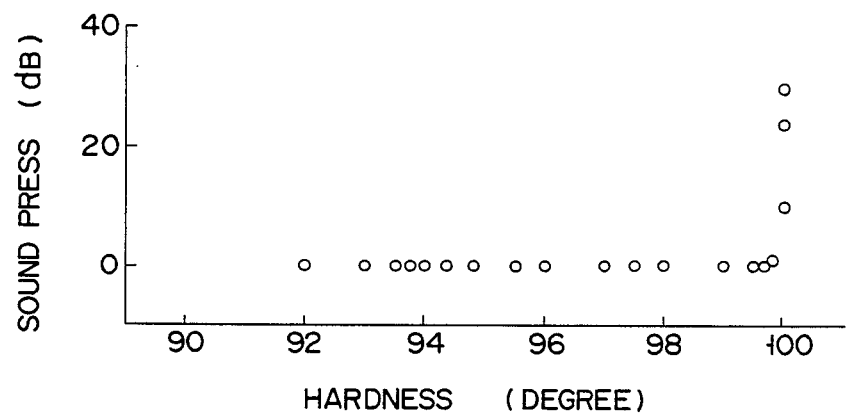
FIG. 10 is a graph showing the relationship between the hardness of the friction member and a sound pressure level.

FIG. 10 shows the relationship between the hardness of the friction member material and a sound pressure level [dB]. When the hardness of the material is 100, the sound pressure level is high, i.e., a large noise is generated. However, when the hardness is less than 100, the sound pressure level is substantially zero.

As is apparent from FIGS. 8 to 10 according to the first embodiment, since the material having a hardness larger than 94 and less than 100 is used for the friction member in the ultrasonic motor, a motor torque is large, frictional noise is small, and durability is high.

Figure 11:
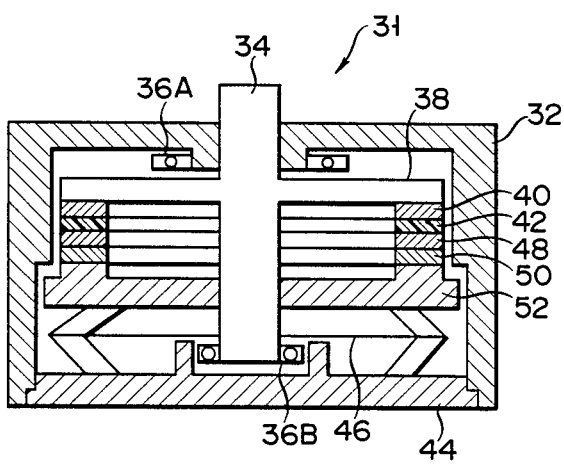
FIG. 11 is a schematic sectional view of a rotational ultrasonic motor according to a second embodiment of the present invention.
Figure 12:
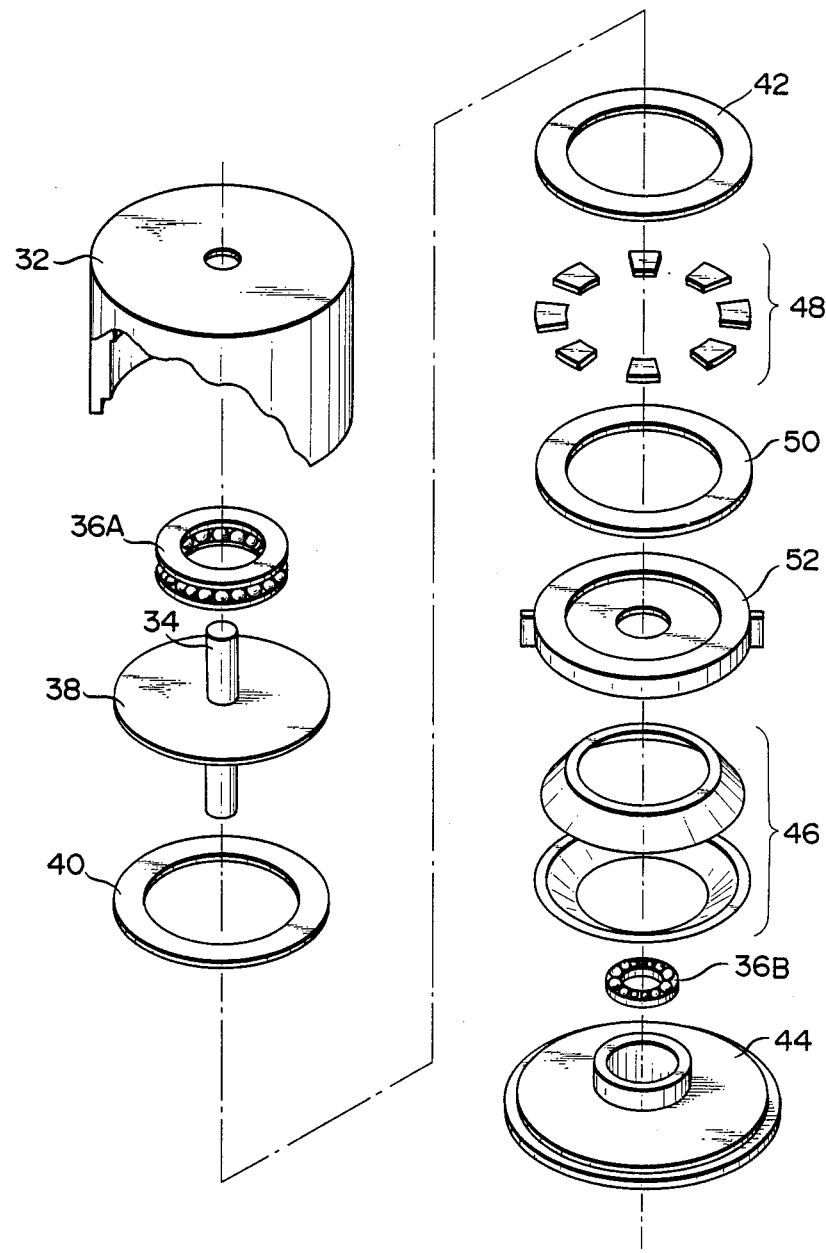
FIG. 12 is an exploded perspective view of the ultrasonic motor in FIG. 11.

A second embodiment of the present invention will be described in detail with reference to FIGS. 11 and 12. In the second embodiment, the ultrasonic motor comprises rotary moto 31. Shaft 34 is rotatably supported by bearings 36A and 36B in case 32, to transmit a driving force outside case 32. Disc-like sliding member 38, made of a metal, is integral with shaft 34. Ring-like friction member 40 is attached to the lower surface of member 38. Duralumin elastic vibration member 42 (outer and inner diameters of which are 60 mm and 50 mm) is in contact with member 40. Member 42 is biased against member 40 by bellville spring 46 arranged inside cover 44 of case 32.

Member 40 is made of the same material as in the first embodiment, i.e., a material having a hardness of 94 to 100, measured by the spring A type hardness tester.

Eight PZT piezoelectric resonators 48 are arranged on the surface (i.e., the lower surface) of member 42, on the spring 46 side, at equal angular intervals. Shock absorber 50 and support 52 are interposed between resonators 48 and spring 46.

In motor 31 of the second embodiment, an AC voltage of $V1 = V0 \times \sin(wt)$ is supplied to one of resonators 48 so as to allow an elastic wave of two wavelengths to propagate along vibration member 42. The phase of the voltage is shifted by 90 degrees so that the voltages of different phases are sequentially supplied to the adjacent piezoelectric resonators. Shaft 34, integrally formed with the sliding member can be rotated.

Since the friction member is made of the material having a spring A type hardness of 94 to 100, the same effect as in the first embodiment can be obtained in the second embodiment.

TEST EXAMPLE 2

Other materials for the friction member will be described below. In the test example 2, the friction member material has a hardness of 40 to 120 measured by a Rockwell's R type hardness tester.

Influences of different hardness values of ABS resin of member 40 on the sliding member in motor 31 of the second embodiment were examined.

Figure 13:
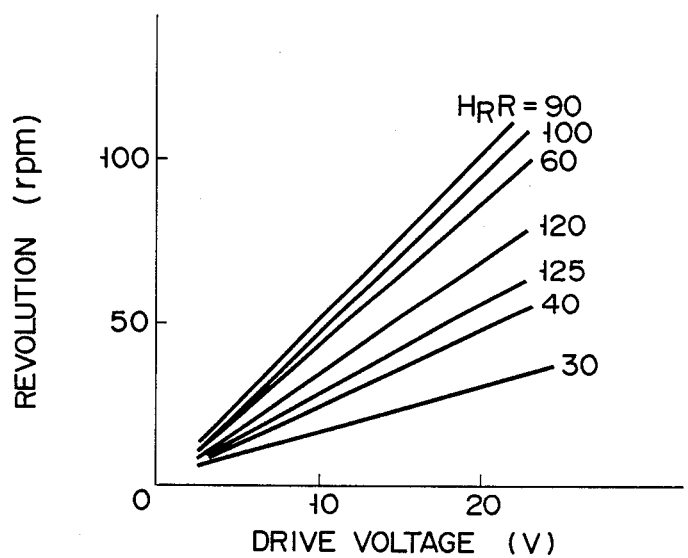
FIG. 13 is a graph showing the relationship between the revolution of the sliding member and the drive voltage when the hardness of the friction member is used as a parameter.

FIG. 13 shows the relationship between the drive voltage and the revolution per minute of the sliding member when the Rockwell's R type hardness serves as a parameter. As is apparent from FIG. 13, when the Rockwell's R type hardness ($H_RR$) falls within the range of 40 and 120, a relatively high speed can be obtained at a predetermined drive voltage.

Figure 14:
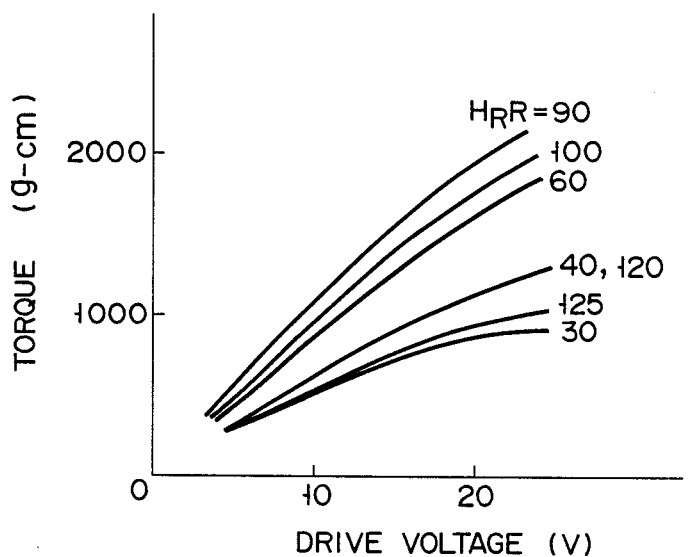
FIG. 14 is a graph showing the relationship between the motor torque and the drive voltage when the hardness of the friction member is used as a parameter.

FIG. 14 shows the relationship between the drive voltage and the motor torque when the Rockwell's R type hardness $H_RR$ serves as a parameter. As shown in FIG. 14, when the hardness $H_RR$ of member 40 falls within the range of 40 to 120, a relatively high torque can be obtained at a predetermined voltage.

Figure 15:
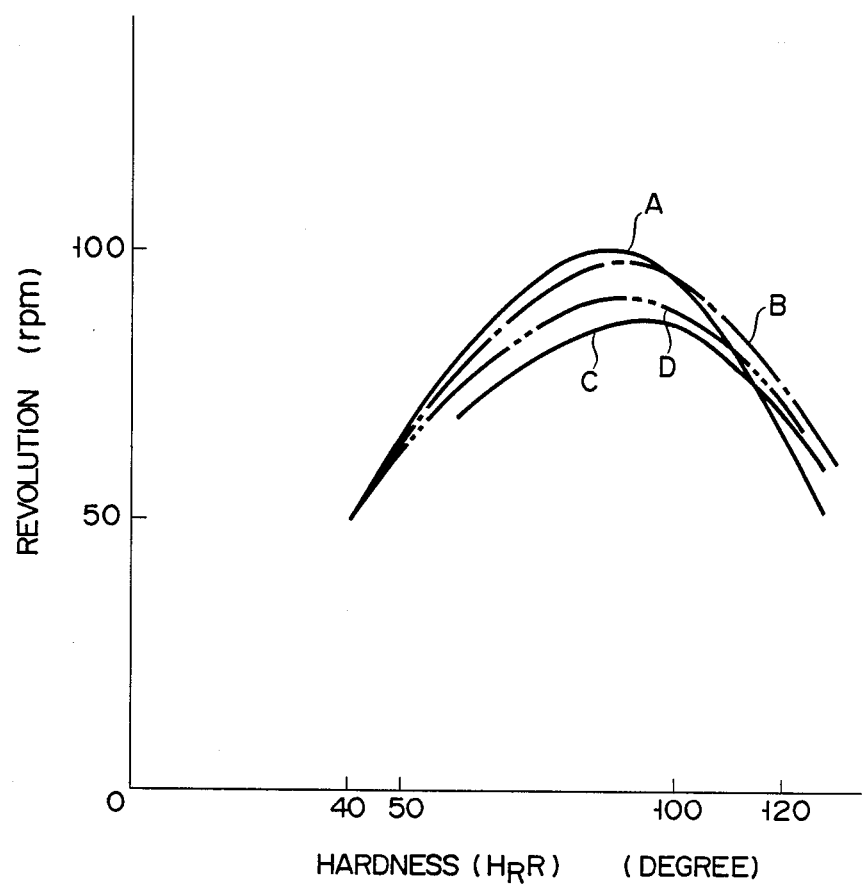
FIG. 15 is a graph showing the relationship between the hardness of various friction members and the revolution of the sliding member
Figure 16:
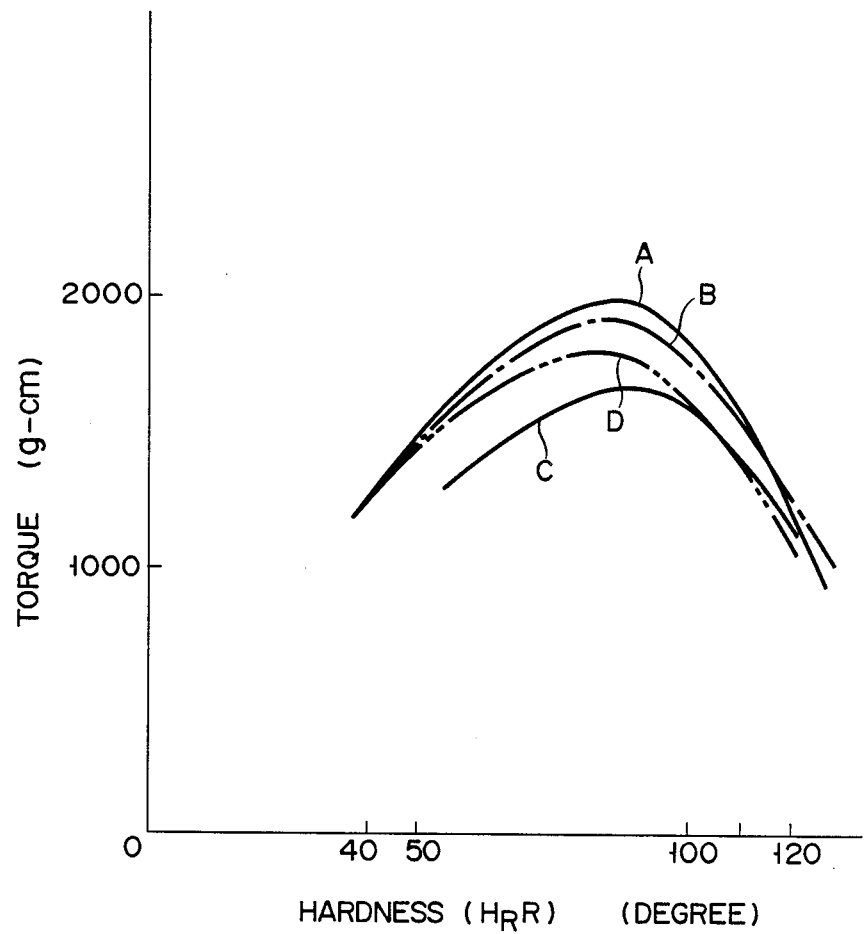
FIG. 16 is a graph showing the relationship between the hardness of various friction members and the motor torque.

FIG. 15 shows the relationship between the Rockwell's R type hardness ($H_RR$) of member 40 and the revolution per minute of member 38 at a drive voltage of 20 V when various materials are used for member 40. FIG. 16 shows the relationship between the Rockwell's R type hardness $H_RR$ of the friction member and the motor torque. As is apparent from FIGS. 15 and 16, good test results concerning the revolution of the sliding member and the motor torque can be obtained when the Rockwell's R type hardness ($H_RR$) falls within the range of 40 to 120.

TEST EXAMPLE 3

Various values of parameters of the linear ultrasonic motor of the first embodiment were measured when a voltage 200 V was applied to resonator 24.

Figure 17:
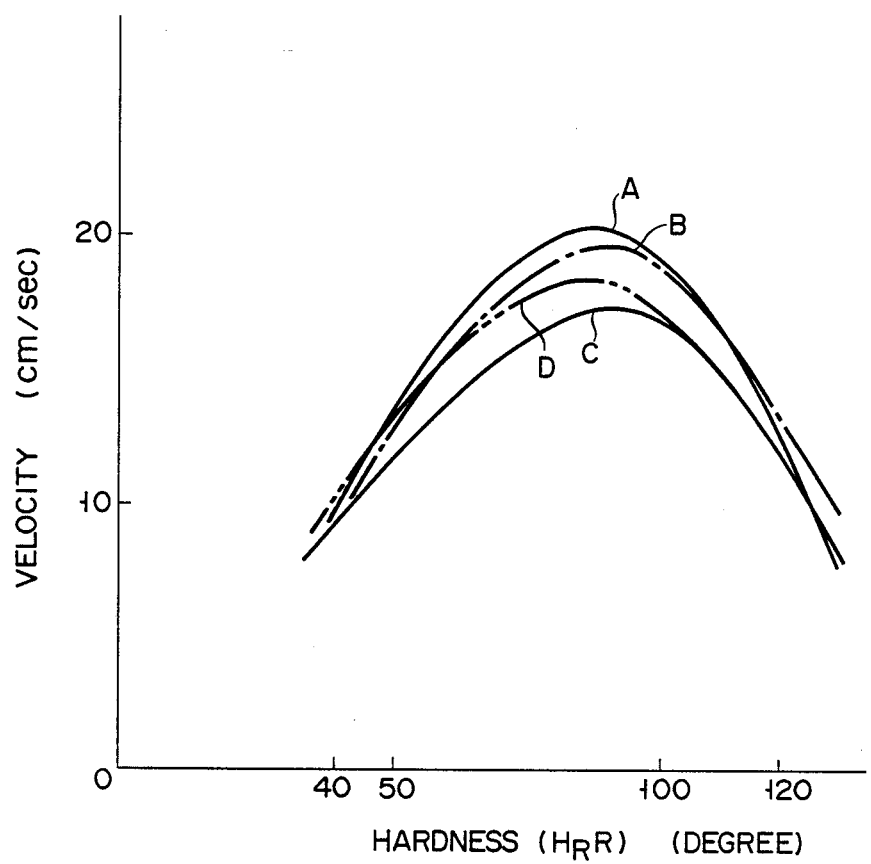
FIG. 17 is a graph showing the relationship between the velocity of the sliding member and the hardness of various friction members.
Figure 18:
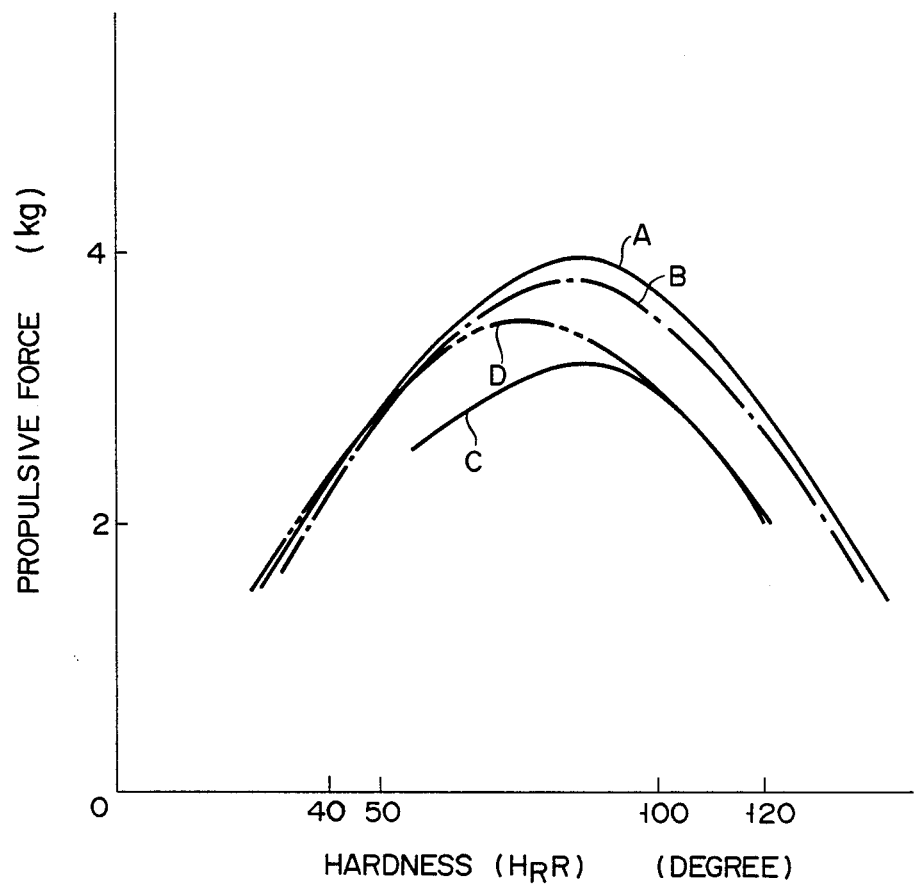
FIG. 18 is a graph showing the relationship between the hardness of various friction members and the propulsive force of various sliding members.

FIG. 17 shows the relationship between the Rockwell's R type hardness $H_RR$ of member 30 and its velocity when various materials are used. FIG. 18 shows the relationship between the hardness $H_RR$ and the propulsive force. The materials were the same as those in Test Example 2. In Example 3, the voltage of 200 V was applied to resonator 24. When the voltage was changed, the velocity of the sliding member was changed substantially in proportion to the voltage change. As is apparent from FIGS. 17 and 18, variations are present in the motor, depending on the materials used for the friction member. However, good results concerning the sliding member velocity and the propulsive force were obtained when the Rockwell's R type hardness tester indicated a hardness of 40 to 120.

Paper, cloth, leather, rubber, thermoplastic, thermoset, copolymer, resin and mixture material may be given as major examples of materials which hardness falls within the hardness range of 40 to 120 measured by a Rockwell's R type hardness tester. An additive such as an inorganic powder or a fibrous material is added to each of the above materials for controlling its hardness.

What follows are major kinds of rubber, thermoplastic, thermoset, copolymer, resin, and mixture material.
Rubber:

natural rubber (NR), styrene-butadiene rubber (SBR), butadiene rubber (BR), chloroprene rubber (CR), acrylonitrite-butadiene rubber (NBR), ethylene-propylene rubber (EPR), ethylene-propylene-diene terpolymer (EPDM), isoprene rubber (IR), isobutylene-isoprene rubber (IIR), acrylic rubber, urethan rubber.

Thermoplastic:
styrene resin, acrylic resin, polyethylene resin, polyamide resin, fluoroplastics, polyester resin, vinylidene chloride resin, polysulfone resin, polyphenylene sulfide.

Thermoset:
epoxy resin, unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ABS resin, ethylene-vinyl acetal copolymer resin (EVA), fluorinated ethylene propylene resin (FEP), MM resin, acetal resin, copolymer of epoxy resin and silicon resin, copolymer of polyethylene resin and styrene resin, copolymer of butadiene rubber (BR) and isobutylene-isoprene rubber (IIR), copolymer of chroloprene rubber (CR) and acrylonitrilebutadiene rubber (NBR).

Mixture material:
epoxy resin and acrylonitrile butadiene rubber (NBR), unsaturated polyester and styrene-butadiene rubber (SBR).

TEST EXAMPLE 4

Epoxy resin was used for member 40 in motor 31 of the second embodiment, the influences of various Rockwell's M type hardness ($H_RM$) for friction member 40 on sliding member 38 were examined.

Figure 19:
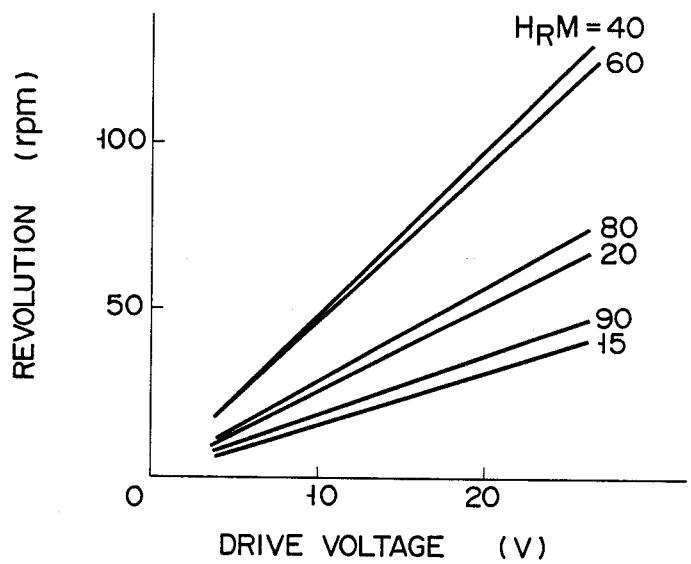
FIG. 19 is a graph showing the relationship between the revolution of the sliding member and the drive voltage when the hardness of various friction members is used as a parameter.
Figure 20:
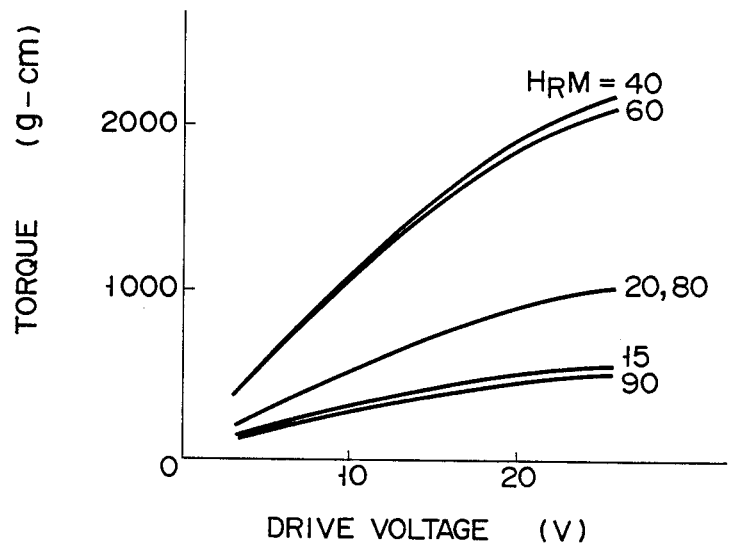
FIG. 20 is a graph showing the relationship between the motor torque and the drive voltage when the hardness of various friction members is used as a parameter.

FIG. 19 shows the relationship between the revolution per minute of member 38 and the drive voltage applied to the ultrasonic motor, and FIG. 20 shows the relationship between the drive voltage and the motor torque. As is apparent from FIGS. 19 and 20, when the Rockwell's M type hardness ($H_RM$) of the friction member falls within the range of 20 to 80, a relatively or revolution per minute high speed and a relatively large torque were obtained. The characteristics shown in FIGS. 19 and 20 are not limited to epoxy resin.

Paper, cloth, leather, rubber, thermoplastic, thermoset, copolymer, resin and mixture material may be given as major examples of materials which hardness falls within the hardness range of 20 to 80 measured by a Rockwell's M type hardness tester. An additive such as an inorganic powder or a fibrous material is added to each of the above materials for controlling its hardness.

What follows are major kinds of rubber thermoplastic, thermoset, copolymer, resin, and mixture material.

Rubber:
natural rubber (NR), styrene-butadiene rubber (SBR), butadiene rubber (BR), chloroprene rubber (CR), acrylonitrile-butadiene rubber (NBR), ethylene-propylene rubber (EPR), ethylenepropylene-diene terpolymer (EPDM), isoprene rubber (IR), isobutylene-isoprene rubber (IIR), acrylic rubber, urethan rubber.

Thermoplastic:
styrene resin, acrylic resin, polyethylene resin, polyamide resin, fluoroplastics, polyester resin, vinylidene chloride resin, polysulfone resin, polyphenylene sulfide.

Thermoset:
unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ABS resin, ethylene-vinyl acetal copolymer resin (EVA), fluorinated ethylene propylene resin (FEP), MM resin, acetal resin, copolymer of epoxy resin and silicon resin, copolymer of polyethylene resin and styrene resin, copolymer of butadiene rubber (BR) and isobutylene-isoprene rubber (IIR), copolymer of chroloprene rubber (CR) and acrylonitrile-butadiene rubber (NBR).

Mixture material:
epoxy resin and acrylonitrile butadiene rubber (NBR), unsaturated polyester and styrene-butadiene rubber (SBR).

Figure 21:
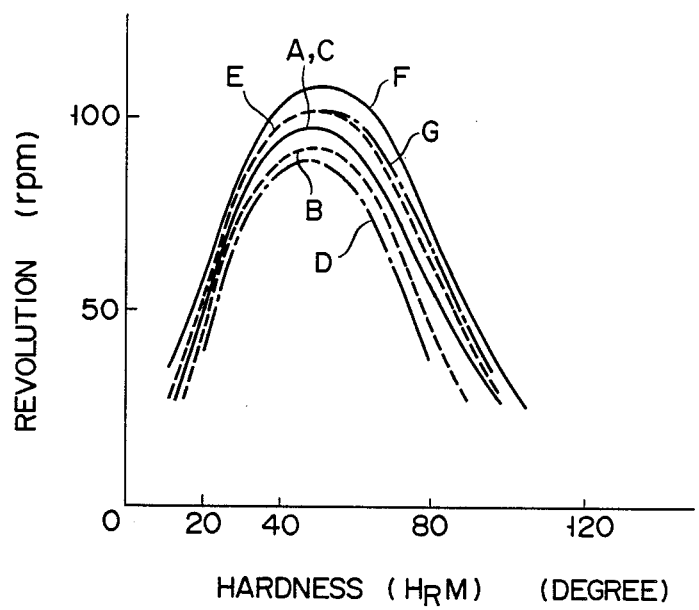
FIG. 21 is a graph showing the relationship between the hardness of various frictional members and the revolution of the motor speed.
Figure 22:
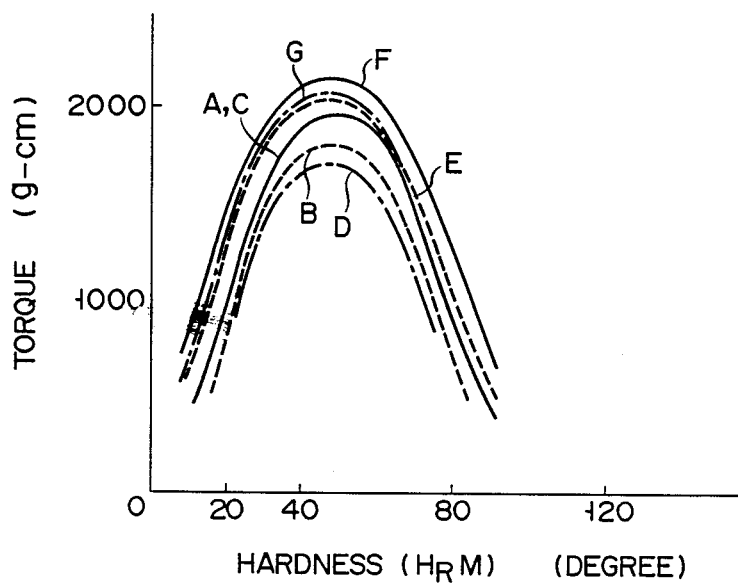
FIG. 22 is a graph showing the relationship between the hardness of various friction members and the motor torque.

FIG. 21 shows the relationship between the Rockwell's M type hardness ($H_RM$) of member 40 and the revolution per minute or speed of member 38 at a drive voltage of 20 V when different materials were used for member 40. FIG. 22 shows the relationship between the friction material hardness, Rockwell's M type hardness ($H_RM$), and the torque. Reference symbols in FIGS. 21 and 22 denote the following the materials.

A: epoxy resin
B: copolymer of epoxy resin and silicone resin
C: ABS resin
D: polyamide resin
E: copolymer of polyethylene resin and styrene resin
F: chloroprene rubber (CR)
G: mixture of unsaturated polyester resin and styrene-butadiene rubber (SBR)

As is apparent from FIGS. 21 and 22, if the Rockwell's M type hardness ($H_RM$) of a material falls within the range of 20 to 80, the material can be used in the ultrasonic motor when the sliding member speed and the torque are taken into consideration. However, when the hardness $H_RM$ is smaller than 15, the torque is undesirably decreased. However, when the hardness exceeds 80, a large noise is generated. In addition, the torque is decreased when the hardness is increased to 85. This tendency was found not only in epoxy resin, a copolymer of epoxy resin and silicone resin, ABS resin, polyamide resin, a copolymer of polyethylene resin and styrene resin, CR, and a mixture of unsaturated polyester resin and SBR.

Paper, cloth, leather, rubber, thermoplastic, thermoset, copolymer, resin and mixture material may be given as major examples of materials which hardness falls within the Rockwell's M type hardness range 20 to 80. An additive such as an inorganic powder or a fibrous material is added to each of the above materials for controlling its hardness.

What follows are major kinds of rubber, thermoplastic, thermoset, copolymer, resin, and mixture material.

Rubber:
natural rubber (NR), styrene-butadiene rubber (SBR), butadiene rubber (BR), acrylonitrile butadiene rubber (NBR), ethylene-propylene rubber (EPR), ethylene-propylene-diene terpolymer (EPDM), isoprene rubber (IR), isobutylene-isoprene rubber (IIR), acrylic rubber, urethan rubber.

Thermoplastic:

styrene resin, acrylic resin, polyethylene resin, fluoroplastics, polyester resin, vinylidene chloride resin, polysulfone resin, polyphenylene sulfide.

Thermoset:
unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ethylene-vinyl acetal copolymer resin (EVA), fluorinated ethylene propylene resin (FEP), MM resin, acetal resin, copolymer of butadiene rubber (BR) and isobutylene-isoprene rubber (IIR), copolymer of chroloprene rubber (CR) and acrylonitrile-butadiene rubber (NBR).

Mixture material:
epoxy resin and acrylonitrile butadiene rubber (NBR), unsaturated polyester and styrene-butadiene rubber (SBR).

In Example 4, member 40 is formed integrally with member 38. However, the same effect can be obtained if member 40 is simply inserted between member 38 and member 42.

TEST EXAMPLE 5

Figure 23:
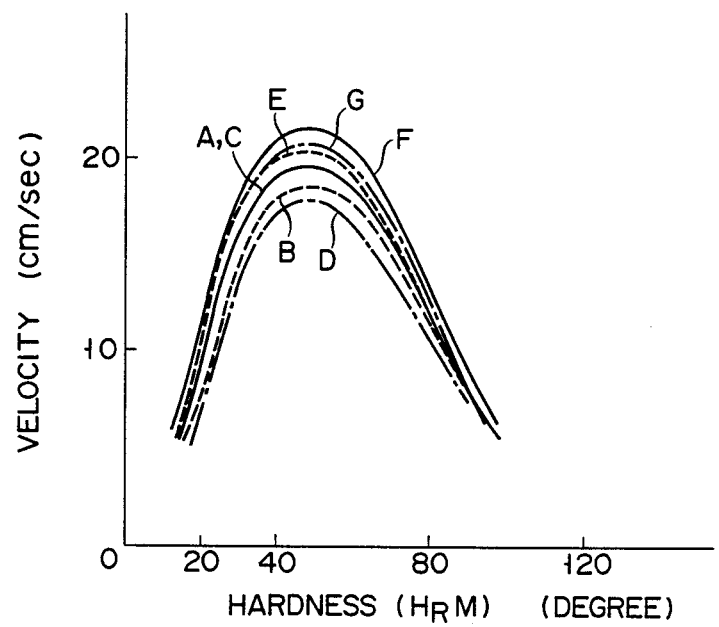
FIG. 23 is a graph showing the relationship between the hardness of various friction members and the velocity of the sliding member.
Figure 24:
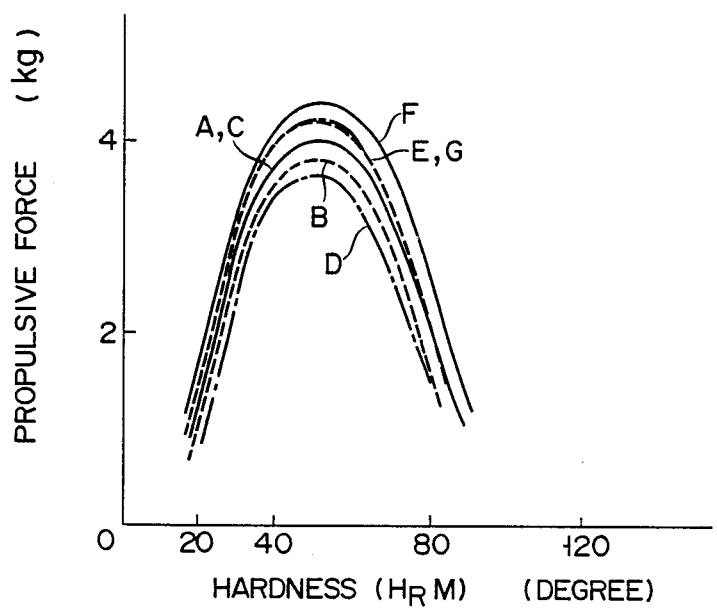
FIG. 24 is a graph showing the relationship between the hardness of various friction members and the propulsive force of the sliding member.

Influences of different materials on sliding member 28 were examined under the same conditions of Example 4, using motor 20 of the first embodiment. In motor 20, member 22 was a 5-mm cube, and two PZT piezoelectric resonators 24 and 26 were fixed at two ends of member 22. Member 28 was made of aluminum, and member 30 was fixed to aluminum member 28. Member 30 was mounted on member 28 such that member 30 and resonators 24 and 26 sandwiched vibration member 22 therebetween. A voltage of 200 V was supplied to resonator 24. FIG. 23 shows the relationship between the Rockwell's M type hardness ($H_RM$) of the friction member and the velocity of the sliding member. FIG. 24 shows the relationship between the Rockwell's M type hardness ($H_RM$) and the propulsive force acting on member 28. The materials of the friction member are the same as those in Example 4, and are represented by the same reference symbols (A, B, C, D, E, F, G). A voltage of 200 V was supplied to the PZT resonator, and was changed. In this case, it was estimated that the velocity of the sliding member was changed in proportion to the change in voltage. As is apparent from FIGS. 23 and 24, small variations in characteristics of the linear ultrasonic motor are found depending on the type of material used, in the same manner as in the rotary motor. However, when Rockwell's M type hardness of the materials falls within the range of 20 to 80, a large propulsive force can be obtained. The same effect can also be obtained for other materials.

Paper, cloth, leather, rubber, thermoplastic, thermoset, copolymer, resin and mixture material may be given as major examples of materials which hardness falls within the Rockwell's M type hardness range 20 to 80. An additive such as an inorganic powder or a fibrous material is added to each of the above materials for controlling its hardness.

What follows are major kinds of rubber, thermoplastic, thermoset, copolymer, resin, and mixture material.

Rubber:
natural rubber (NR), styrene-butadiene rubber (SBR), butadiene rubber (BR), acrylonitrilebutadiene rubber (NBR), ethylene-propylene rubber (EPR), ethylene-propylene-diene terpolymer (EPDM), isoprene rubber (IR), isobutylene-isoprene rubber (IIR), acrylic rubber, urethan rubber.

Thermoplastic:
styrene resin, acrylic resin, polyethylene resin, fluoroplastics, polyester resin, vinylidene chloride resin, polysulfone resin, polyphenylene sulfide.

Thermoset:
unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ethylene-vinyl acetal copolymer resin (EVA), fluorinated ethylene propylene resin (FEP), MM resin, acetal resin, copolymer of butadiene rubber (BR) and isobutylene-isoprene rubber (IIR), copolymer of chroloprene rubber (CR) and acrylonitrile-butadiene rubber (NBR).

Mixture material:
epoxy resin and acrylonitrile butadiene rubber (NBR), unsaturated polyester and styrene-butadiene rubber (SBR).

As described in Examples 4 and 5, when the friction member is made of a material (e.g., thermosetting resin, rubber, or thermoplastic resin) having a Rockwell's M type hardness in the range of 20 to 80, ultrasonic motors can be obtained wherein changes in physical properties of the friction member can be decreased, and noise and durability can be improved.

TEST EXAMPLE 6

In the test example 6, the friction member material has a hardness of 40 to 90 measured by a Shore A type hardness tester, but in the case of over 90, of 20 to 70 measured by Shore D type hardness tester.

Influences of various Shore hardness values of ABS resin of member 40 on the sliding member in motor 31 of the second embodiment were examined.

FIG. 25 shows the relationship between the drive voltage and the revolution per minute of the sliding member when the Shore A and D type hardness serves as a parameter. As is apparent from FIG. 25, when the hardness falls within the range of 40 to 90 of Shore A type hardness or 20 to 70 of Shore D type hardness, a relatively high speed can be obtained at a predetermined drive voltage.

FIG. 26 shows the relationship between the drive voltage and the motor torque when the Shore A and D type hardness serves as a parameter. As shown in FIG. 26, when the hardness of member 40 falls within the range of 40 to 90 of Shore A type hardness or 20 to 70 of Shore D type hardness, a relatively high torque can be obtained at a predetermined voltage.

Figure 27:
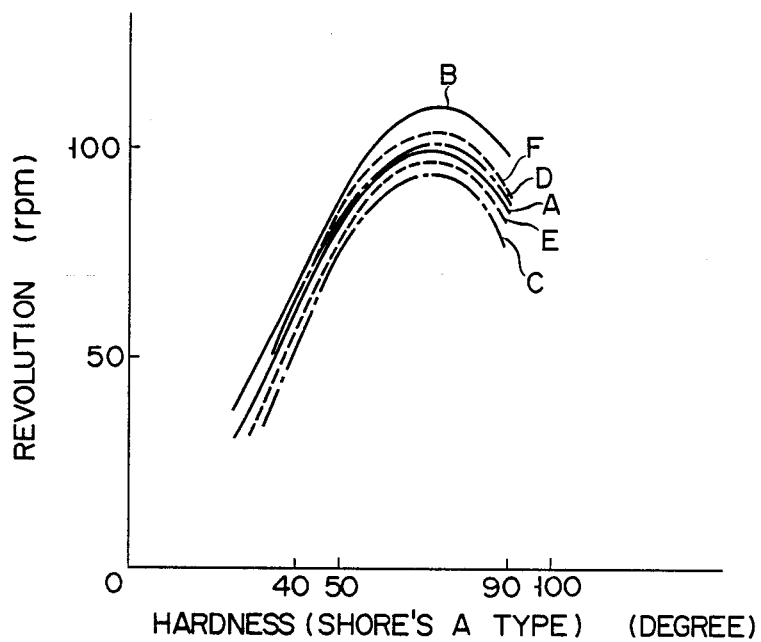
FIG. 27 is a graph showing the relationship between the revolution of the sliding member and the Shore A type hardness of various friction members is used as a parameter.
Figure 29:
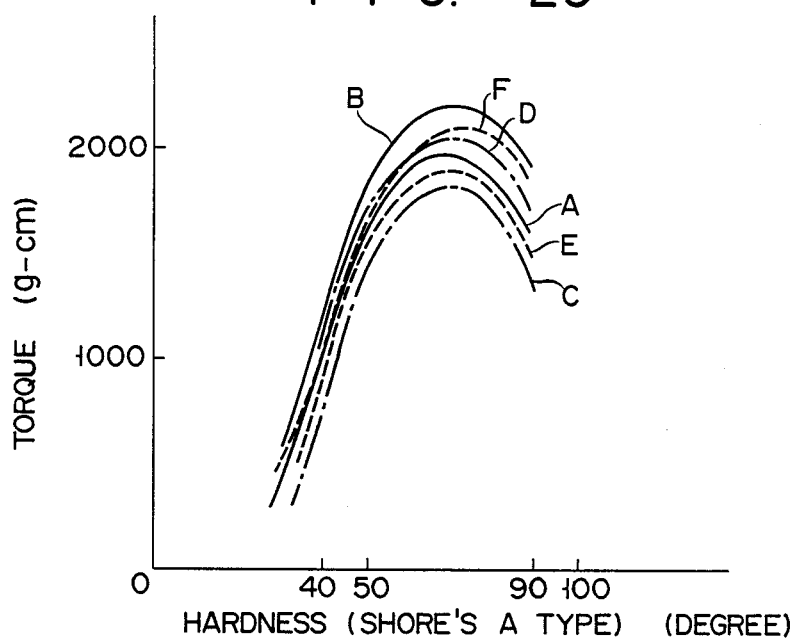
FIG. 29 is a graph showing the relationship between the Shore hardness A type of various friction members and the motor torque.

FIG. 27 shows the relationship between the Shore A type hardness of member 40 and the revolution per minute of member 38 at a drive voltage of 20 V when various materials are used for member 40. FIG. 29 shows the relationship between the Shore A type hardness of the friction member and the motor torque. As is apparent from FIGS. 27 and 29, good test results concerning the revolution of the sliding member and the motor torque can be obtained when the Shore A type hardness falls within the range of 40 to 90.

Figure 28:
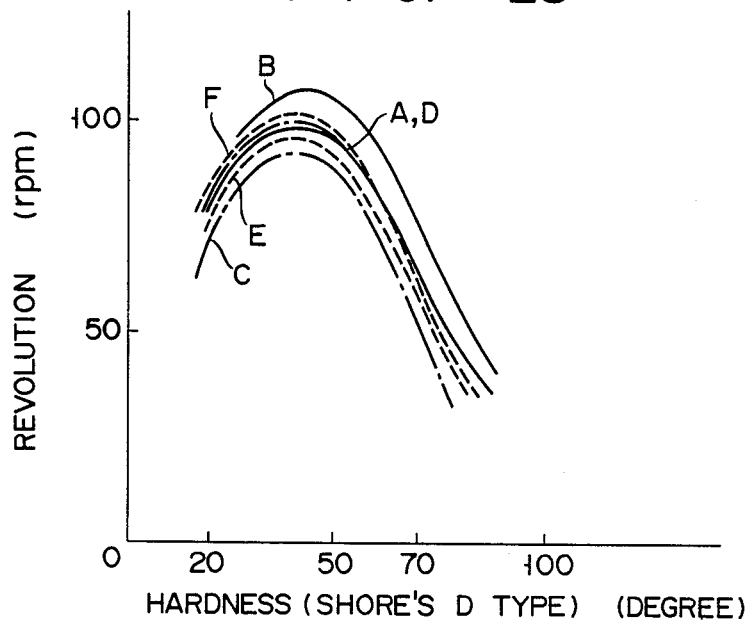
FIG. 28 is a graph showing the relationship between the revolution of the sliding member and the Shore D type hardness of various friction members is used as a parameter.
Figure 30:
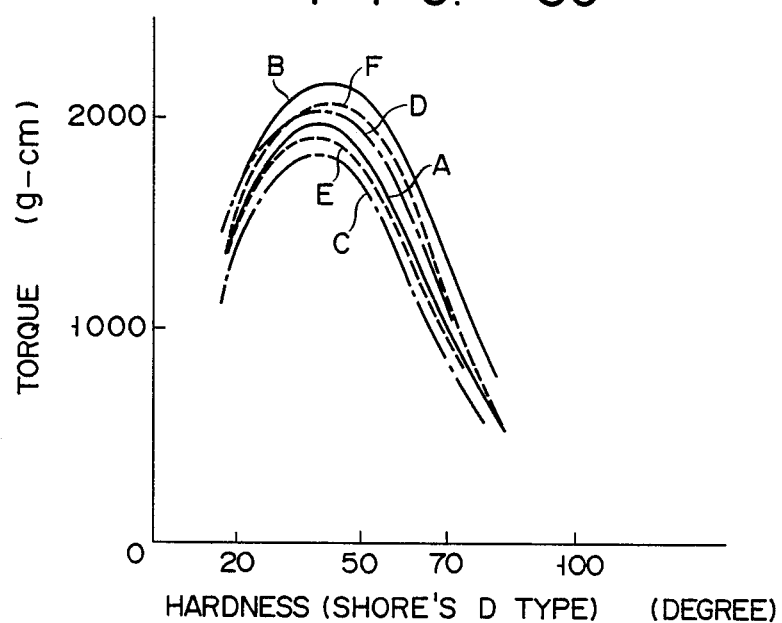
FIG. 30 is a graph showing the relationship between the Shore hardness D type of various friction members and the motor torque.

FIG. 28 shows the relationship between the Shore D type hardness of member 40 and the revolution per minute of member 38 at a drive voltage of 20 V when various materials are used for member 40. FIG. 30 shows the relationship between the Shore D type hardness of the friction member and the motor torque. As is apparent from FIGS. 28 and 30, good test results concerning the revolution of the sliding member and the motor torque can be obtained when the Shore D type hardness falls within the range of 20 to 70.

Paper, cloth, leather, rubber, thermoplastic, thermoset, copolymer, resin and mixture material may be given as major examples of materials which hardness falls within the hardness range of 40 to 90 measured by measured by a Shore D type hardness tester. An additive such as an inorganic powder or a fibrous material is added to each of the above materials for controlling its hardness.

What follows are major kinds of rubber, thermoplastic, thermoset, copolymer, resin, and mixture material.

Rubber:
natural rubber (NR), styrene-butadiene rubber (SBR), butadiene rubber (BR), chloroprene rubber (CR), acrylonitrile-butadiene rubber (NBR), ethylene-propylene rubber (EPR), ethylene propylenediene terpolymer (EPDM), isoprene rubber (IR), isobutylene-isoprene rubber (IIR), acrylic rubber, urethan rubber.

Thermoplastic:
styrene resin, acrylic resin, polyethylene resin, polyamide resin, fluoroplastics, polyester resin, vinylidene chloride resin, polysulfone resin, polyphenylene sulfide.

Thermoset:
epoxy resin, unsaturated polyester, phenolic resin, urea resin, melamine resin, furan resin, polyimide resin, diallyl phthalate resin, silicone resin, alkyl resin.

Copolymer resin:
acrylonitrile-styrene resin (AS resin), BS resin, ethylene-vinyl acetal copolymer resin (EVA), fluorinated ethylene propylene resin (FEP), MM resin, acetal resin, copolymer of epoxy resin and silicon resin, copolymer of polyethlene resin and styrene resin, copolymer of butadiene rubber (BR) and isobutylene-isoprene rubber (IIR), copolymer of chroloprene rubber (CR) and acrylonitrile-butadiene rubber (NBR).

Mixture material:
epoxy resin and acrylonitrile butadiene rubber (NBR), unsaturated polyester and styrene-butadiene rubber (SBR).

What is claimed is:

1. An ultrasonic motor comprising:
piezoelectric resonators for generating vibration waves;
an elastic vibration member along which an elastic wave propagates when said piezoelectric resonators are driven;
a sliding member located in contact with said elastic vibration member under pressure and adapted to slide along said elastic vibration member when the elastic wave propagates; and
a friction member located on said sliding member and brought into frictional contact with said elastic vibration member, said friction member being made of a resinous material to which is added an additive selected from the group consisting of an inorganic powder and a fibrous material and having a hardness of less than 100 and more than 94 measured by a spring A type hardness tester.

2. A motor according to claim 1, wherein said friction material is selected from the group consisting of natural rubber, styrene-butadiene rubber, butadiene rubber, chloroprene rubber, acrylonitrile-butadiene rubber, ethylene-propylene rubber, ethylene-propylenediene terpolymer, isoprene rubber, isobutylene-isoprene rubber, acrylic rubber, and urethan rubber.

3. A motor according to claim 1, wherein said friction material is made of thermoplastic.

4. A motor according to claim 4, wherein said friction material is selected from the group consisting of styrene resin, acrylic resin, polyethylene resin, polyamide resin, fluoroplastics, polyester resin, vinylidene chloride resin, polysulfone resin, and polyphenylene sulfide.

5. A motor according to claim 1, wherein said friction material is made of thermoset.

6. A motor according to claim 5, wherein said friction material is selected from the group consisting of epoxy resin, unsaturated polyester, phenolic resin, melamine resin, urea resin, furan resin, polyimide resin, diallyl phthalate resin, silicone resin, and alkyl resin.

7. A motor according to claim 1, wherein said friction material is made of copolymer resin.

8. A motor according to claim 7, wherein said friction material is selected from the group consisting of acrylonitrile-styrene resin, BS resin, ABS resin, ethylene-vinyl acetal copolymer resin, fluorinated ethylene propylene resin, MM resin, acetal resin, copolymer of epoxy resin and silicon resin, copolymer of polyethylene resin ans styrene resin, copolymer of butadiene rubber and isobutylene-isoprene rubber, and copolymer of chroloprene rubber and acrylonitrile-butadiene rubber.

9. A motor according to claim 1, wherein said friction material is selected from the group consisting of mixture epoxy resin with acrylonitrile butadiene rubber, unsaturated polyester with styrene-butadiene rubber.

10. An ultrasonic motor comprising:
piezoelectric resonators for generating vibration waves;
an elastic vibration member along which an elastic wave propagates when said piezoelectric resonators are driven;
a sliding member located in contact with said elastic vibration member under pressure and adapted to slide along said elastic vibration member when the elastic wave propagates; and
a friction member located on said sliding member and brought into frictional contact with said elastic vibration member, said friction member being made of a resinous material to which is added an additive selected from the group consisting of an inorganic powder and a fibrous material and having a hardness within the range of 40 to 120 measured by a Rockwell's R type hardness tester.

11. A motor according to claim 10, wherein said friction material is selected from the group consisting of natural rubber, styrene-butadiene rubber, butadiene rubber, chloroprene rubber, acrylonitrile-butadiene rubber, ethylene-propylene rubber, ethylene-propylenediene terpolymer, isoprene rubber, isobutylene-isoprene rubber, acrylic rubber, and urethan rubber, 12. A motor according to claim 11, wherein said friction material is made of thermoplastic.

13. A motor according to claim 12, wherein said friction material is selected from the group consisting of styrene resin, acrylic resin, polyethylene resin, polyamide resin, fluoroplastics, polyester resin, vinylidene chloride resin, polysulfone resin, and polyphenylene sulfide.

14. A motor according to claim 10, wherein said friction material is made of thermoset.

15. A motor according to claim 14, wherein said friction material is selected from the group consisting of epoxy resin, unsaturated polyester, phenolic resin, melamine resin, urea resin, furan resin, polyimide resin, diallyl phthalate resin, silicone resin, and alkyl resin.

16. A motor according to claim 10, wherein said friction material is made of copolymer resin.

17. A motor according to claim 16, wherein said friction material is selected from the group consisting of acrylonitrile-styrene resin, BS resin, ABS resin, ethylene-vinyl acetal copolymer resin, fluorinated ethylene propylene resin, MM resin, acetal resin, copolymer of epoxy resin and silicon resin, copolymer of polyethylene resin and styrene resin, copolymer of butadiene rubber and isobutylene-isoprene rubber, and copolymer of chroloprene rubber and acrylonitrile-butadiene rubber.

18. A motor according to claim 10, wherein said friction material is selected from the group consisting of mixture epoxy resin with acrylonitrile butadiene rubber, unsaturated polyester with styrene-butadiene rubber.

19. An ultrasonic motor comprising:
piezoelectric resonators for generating vibration waves;
an elastic vibration member along which an elastic wave propagates when said piezoelectric resonators are driven;
a sliding member located in contact with said elastic vibration member under pressure and adapted to slide along said elastic vibration member when the elastic wave propagates; and
a friction member located on said sliding member and brought into frictional contact with said elastic vibration member, said friction member being made of a resinous material to which is added an additive selected from the group consisting of an inorganic powder and a fibrous material and having a hardness within the range of 20 to 80 measured by a Rockwell's M type hardness tester.

20. A motor according to claim 19, wherein said friction material is selected from the group consisting of natural rubber, styrene-butadiene rubber, butadiene rubber, chloroprene rubber, acyrlonitrile-butadiene rubber, ethylene-propylene rubber, ethylene-propylenediene terpolymer, isoprene rubber, isobutylene-isoprene rubber, acrylic rubber, and urenthan rubber.

21. A motor according to claim 19, wherein said friction material is made of thermoplastic.

22. A motor according to claim 21, wherein said friction material is selected from the group consisting of styrene resin, acrylic resin, polyethylene resin, polyamide resin, fluoroplastics, polyester resin, vinylidene chloride resin, polysulfone resin, and polyphenylene, sulfide.

23. A motor according to claim 19, wherein said friction material is made of thermoset.

24. A motor according to claim 23, wherein said friction material is selected from the group consisting of epoxy resin, unsaturated polyester, phenolic resin, melamine resin, urea resin, furan resin, polyimide resin, diallyl phthalate resin, silicone resin, and alkyl resin.

25. A motor according to claim 19, wherein said friction material is made of copolymer resin.

26. A motor according to claim 25, wherein siad friction material is selected from the group consisting of acrylonitrile-styrene resin, BS resin, ABS resin, ethylene-vinyl acetal copolymer resin, fluorinated ethylene propylene resin, MM resin, acetal resin, copolymer of epoxy resin and silicon resin, copolymer of polyethylene resin and styrene resin, copolymer of butadiene rubber and isobutylene-isoprene rubber, and copolymer of chroloprene rubber and acrylonitrile-butadiene rubber.

27. A motor according to claim 19, wherein said friction material is selected from the group consisting of mixture epoxy resin with acrylonitrile butadiene rubber, unsaturated polyester with styrene-butadiene rubber.

28. An ultrasonic motor comprising:
piezoelectric resonators for generating vibration waves;
an elastic vibration member along which an elastic wave propagates when said piezoelectric resonators are driven;
a sliding member located in contact with said elastic vibration member under pressure and adapted to slide along said elastic vibration member when the elastic wave propagates; and
a friction member located on said sliding member and brought into frictional contact with said elastic vibration member, said friction member being made of a resinous material to which is added an additive selected from the group consisting of an inorganic powder and a fibrous material and having a hardness within the range of 40 to 90 measured by a Shore A type hardness tester, or the range of 20 to 70 measured by a Shore D type hardness tester.

29. A motor according to claim 28, wherein said friction material is selected from the group consisting of natural rubber, styrene-butadiene rubber, butadiene rubber, chloroprene rubber, acrylonitrile-butadiene rubber, ethylene-propylene rubber, ethylene-propylenediene terpolymer, isoprene rubber, isobutylene-isoprene rubber, acrylic rubber, and urethan rubber.

30. A motor according to claim 28, wherein said friction material is made of thermoplastic.

31. A motor according to claim 30, wherein said friction material is selected from the group consisting of styrene resin, acrylic resin, polyethylene resin, polyamide resin, fluoroplastics, polyester resin, vinylidene chloride resin, polysulfone resin, and polyphenylene sulfide.

32. A motor according to claim 28, wherein said friction material is made of thermoset.

33. A motor according to claim 32, wherein said friction material is selected from the group consisting of epoxy resin, unsaturated polyester, phenolic resin, melamine resin, urea resin, furan resin, polyimide resin, diallyl phthalate resin, silicone resin, and alkyl resin.

34. A motor according to claim 28, wherein said friction material is made of copolymer resin.

35. A motor according to claim 34, wherein said friction material is selected from the group consisting of acrylonitrile-styrene resin, BS resin, ABS resin, ethylene-vinyl acetal copolymer resin, fluorinated ethylene propylene resin, MM resin, acetal resin, copolymer of epoxy resin and silicon resin, copolymer of polyethylene resin and styrene resin, copolymer of butadiene rubber and isobutylene-isoprene rubber, and copolymer of chroloprene rubber and acrylonitrile-butadiene rubber.

36. A motor according to claim 3, wherein said friction material is selected from the group consist of mixture epoxy resin with acrylonitrile butadiene rubber, unsaturated polyester with styrene-butadiene rubber.

* * * * *